United States Patent
Smith et al.

(10) Patent No.: US 7,254,000 B1
(45) Date of Patent: Aug. 7, 2007

(54) OVER VOLTAGE PROTECTION SCHEME FOR SYNCHRONOUS BUCK CONVERTER

(75) Inventors: Mark Smith, Irvine, CA (US);
Chongming Qiao, Irvine, CA (US);
Vincent Condido, Palo Alto, CA (US);
Reza Amironi, Dana Point, CA (US);
Amir Asvadi, Laguna Hills, CA (US)

(73) Assignee: Nexem, Inc., Irvine, CA (US)

( * ) Notice: Subject to any disclaimer, the term of this patent is extended or adjusted under 35 U.S.C. 154(b) by 149 days.

(21) Appl. No.: 11/156,767

(22) Filed: Jun. 20, 2005

(51) Int. Cl.
*H02H 9/00* (2006.01)
(52) U.S. Cl. .......................... 361/56; 323/224
(58) Field of Classification Search .............. 361/56
See application file for complete search history.

(56) References Cited

U.S. PATENT DOCUMENTS

| | | | |
|---|---|---|---|
| 4,150,424 A * | 4/1979 | Nuechterlein | 363/26 |
| 5,420,491 A | 5/1995 | Kanzaki et al. | 318/727 |
| 5,801,516 A | 9/1998 | Rice et al. | 322/37 |
| 5,808,453 A * | 9/1998 | Lee et al. | 323/224 |
| 6,304,473 B1 * | 10/2001 | Telefus et al. | 363/97 |
| 6,473,284 B1 | 10/2002 | Ilic et al. | 361/91.1 |
| 6,873,191 B2 | 3/2005 | Dequina et al. | 327/110 |
| 6,922,044 B2 * | 7/2005 | Walters et al. | 323/288 |
| 7,049,711 B2 * | 5/2006 | Kanouda et al. | 307/66 |
| 2002/0149953 A1 | 10/2002 | Smedley et al. | 363/84 |
| 2003/0112568 A1 | 6/2003 | Holt et al. | 361/91.1 |
| 2003/0227784 A1 | 12/2003 | Qiao et al. | 363/21.14 |

FOREIGN PATENT DOCUMENTS

JP   2000-341943   * 12/2000

OTHER PUBLICATIONS

Texas Instruments—TPS5110 Date Sheet Synchronous-Buck PWM Controller http:focus.ti.com/lit/ds/symlink/tps5110.pdf Apr. 2002—Revised Jul. 2004—pp. 1-39.*
Bull, Chris et al., "Integrated Building Block for Dual-Output Buck Converter", Power Electronics Technology, Oct. 2003, pp. 68-74.
"Synchronous Rectified MOSFET Driver with Pre-Biased Load Startup Capability", ISL6608 Data Sheet, Mar. 2004, pp. 1-11, FN9140.1, Intersil Americas Inc.
"Advanced Triple PWM and Dual Linear Power Controller for Portable Applications", IPM6220A Data Sheet, Aug. 2004, pp. 1-18, FN9032.1, Intersil Americas Inc.
"PFC & Ballast Control IC", IR2166 Data Sheet, pp. 1-32, vol. PD60198 rev F, International Rectifier.
"Dual Synchronous PWM Controller With Current Sharing Circuitry and Auto-Restart", IRU3146 Data Sheet, Jun. 25, 2004, pp. 1-30, vol. PD 94702, International Rectifier.

* cited by examiner

*Primary Examiner*—Robert L. Deberadinis
*Assistant Examiner*—Luis E. Román
(74) *Attorney, Agent, or Firm*—Maine & Asmus (57) ABSTRACT

An over voltage protection circuit for single phase and multiphase buck converters. According to one embodiment, upon the occurrence of an over voltage condition, the high side switch is turned Off and the low side switch is On. As the output voltage drops below a lower threshold, the low side switch is turned Off thereby reducing or eliminating negative spikes on the voltage output.

20 Claims, 7 Drawing Sheets

OVER VOLTAGE PROTECTION SCHEME FOR SYNCHRONOUS BUCK CONVERTER

FIELD OF THE INVENTION

The invention relates to power regulation, and more particularly, to over voltage power schemes.

BACKGROUND OF THE INVENTION

The state of the art power management for electronics is growing increasingly complex, dealing with more sensitive components occupying smaller space and having high speed devices operating at relatively low power. There may be multiple power sources on certain systems and varied loads.

In general, DC power supply systems for current electronics require highly regulated DC power supplies. There are various protective circuits including over voltage, over current, under voltage and thermal.

One of the well-documented problems with various regulated DC supplies pertains to the over-voltage protection topology. An output over voltage from the voltage regulator section can seriously damage the various electronic circuits coupled to that power source. The over voltage protection is typically triggered by noise or actual over voltage situations.

There have been various attempts to counter the over voltage conditions and various mechanisms to employ such as the crowbar circuit. Crossbars are generally expensive and are relevant for large current loads and expensive electronic devices. Other over protection schemes include pulse width modulated circuits in conjunction with latched logic to turn off the gating FET devices. These latter over voltage protection schemes tend to generate large negative spikes that may damage the circuitry.

What is needed is an over-voltage condition system that senses an over voltage condition and responds accordingly such that no negative spike is generated.

SUMMARY OF THE INVENTIONS

One embodiment of the present invention provides an over voltage protection system. The over voltage protection scheme may be used in conjunction with a buck converter. Such embodiments include single and multi-phase synchronous buck converters.

Another embodiment of the present invention provides an over voltage scheme that does not latch the low side driver during the over voltage condition. In distinction, the low side driver is controlled by the over voltage comparator with hysteresis. One advantage of this scheme in comparison to traditional schemes is that there is no negative spike across the output during the over voltage condition.

A further aspect includes that upon the occurrence of an over voltage, both high side driver as well as the logic input to low side switch driver from PWM control is blocked by the latch output. The low side switch is controlled by a comparator with hysteresis. When the output voltage is above the over voltage threshold, the low side switch is 'On'. When the output voltage is lower than the over voltage comparator lower threshold, the low side switch is turned off. As a result, negative spikes at the output are reduced or eliminated.

One aspect of the present invention is an over voltage protection circuit in a buck converter, comprising at least one switching section in the buck converter, each section having a high side switch and a low side switch for regulating an output voltage of the buck converter. The over voltage protection circuit may comprise a voltage sensing network electrically coupled to the output voltage with a comparator having a first input electrically coupled to the voltage sensing network, and a second input electrically coupled to a reference voltage, wherein a comparator output is electrically coupled to the low side switch. A latch with a latching input can be electrically coupled to the comparator output and a latching output electrically coupled to the high side switch. The over voltage protection circuit can control the low side switch and the high side switch to protect a load during an over voltage condition. Other features include a filter coupled to the comparator output. The comparator can also be a hysteresis comparator with a predetermined hysteresis band. Furthermore, in one embodiment the low threshold of the comparator is based on the predetermined hysteresis band.

Another aspect includes a resistor voltage divider as the voltage sensing network. A further aspect includes wherein the upper threshold voltage is derived from a voltage reference.

An embodiment of the present includes a synchronous buck converter, comprising at least one switching section with a high side switch and a low side switch, wherein the switching section provides a voltage output. A pulse width modulating section is coupled to the switching section and regulates the voltage output. There is an over voltage protection section comprising a hysteresis comparator, wherein the comparator has a first input coupled to a threshold over voltage reference and a second input coupled to an output voltage sensing network. A latch with a latch input is coupled to an output of the comparator wherein an output of the latch latches the high side switch and wherein the low side switch is electrically coupled to the output of the comparator.

The converter as a single phase has one switching section and the converter as a multiphase has multiple switching sections wherein each phase of the multiphase converter is coupled to each switching section. The converter may further comprise a current balance in the pulse width modulator section.

A method for over voltage protection for a synchronous buck converter, comprising sensing an output voltage of a switching section of the buck converter, the switching section having a high side switch and a low side switch, comparing the sensed output voltage to a threshold voltage to determine an over voltage condition. Upon the over voltage condition, latching the high side switch Off, turning the low side switch On, and turning the low side switch Off when the sensed output voltage is below a low threshold voltage. The method of turning the low switch Off tends to reduce a large negative spike on the voltage output.

The method can further comprise resetting the converter or filtering of at least two cycles of sensing and comparing to determine the over voltage condition.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTIONS

The present invention pertains to converters for electronics, and more particularly to an over voltage protection scheme. The examples shown herein depict a synchronous buck converter in single and multi-phase. The pulse width modulation, over voltage protection and switching section in accordance with certain circuit configurations. Various alternatives are within the scope of the invention. For example, while the individual embodiments discussed herein use Metal-Oxide-Semiconductor Field-Effect Transistors (MOSFETs), the switching section can employ any type of switching devices such as other Field-Effect Transistors (FETs) as well as Insulated Gate Bipolar Transistors (IGBTs).

Figure 1:
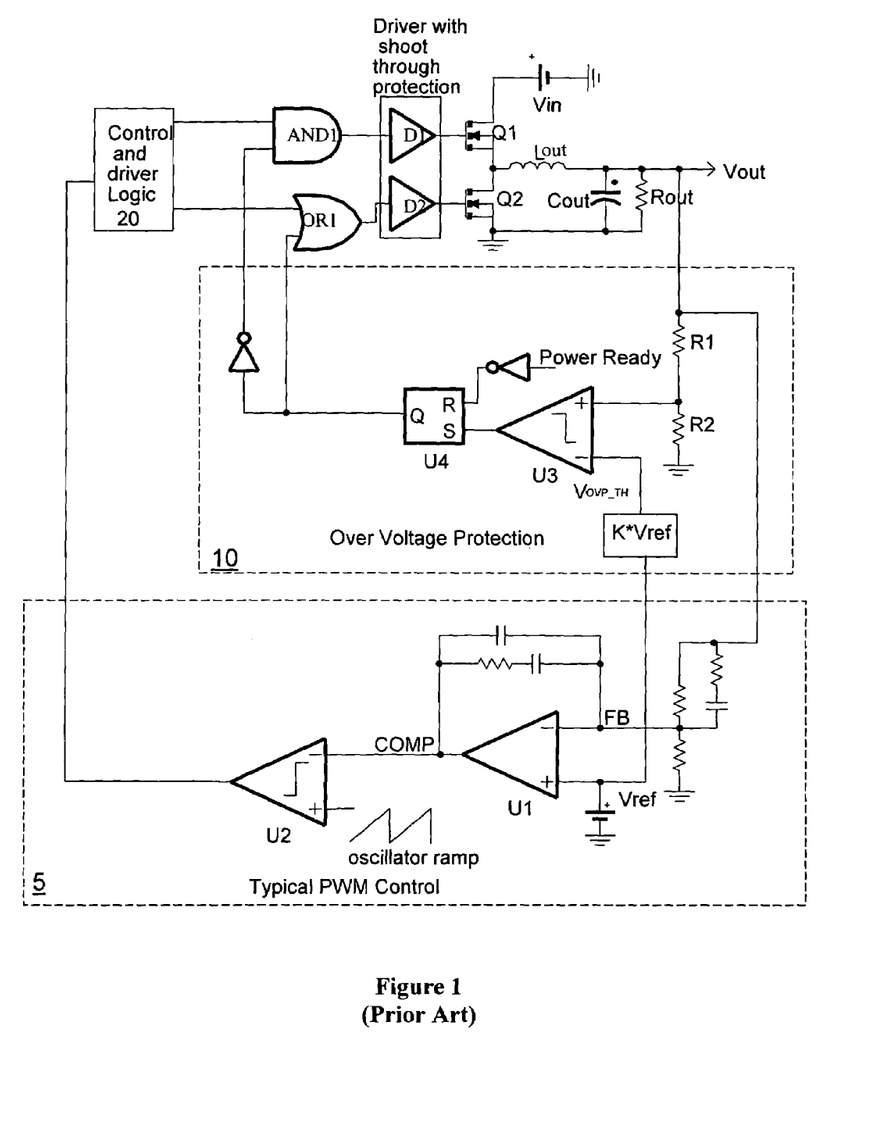
FIG. 1 is a prior art block diagram illustrating an over voltage protection scheme for a synchronous buck converter.

Referring to FIG. 1, a traditional over voltage protection scheme is depicted for a synchronous buck or step-down voltage converter. The buck converter produces an average output voltage lower than the input source voltage, and the inductor serves as a current source to the output load impedance. In a typical operation, the PWM section 5 drives the MOSFETS Q1 and Q2 and regulates the output voltage (Vout).

PWM is a common technique of switching a power source 'On' and 'Off' at a high speed to produce a variable voltage. The effective output voltage depends upon the duty cycle, which represents the portion of each cycle for which the power is switched 'On'. The duty cycle is typically expressed as a percentage, wherein 100% means that the full supply signal is output, 0% would represent 0 volts.

As shown therein, a PWM control circuit 5 supplies a synchronous PWM signal to a control logic unit 20 that establish logic lines signals that control the MOSFETS Q1 and Q2 thereby providing the Vout to the load.

The supply voltage to this portion of the circuit in this example is the input voltage, Vin, which is coupled to the upper MOSFET Q1. The DC-DC synchronous buck converter of FIG. 1 employs an electronic power switching section comprising an upper (or high side) power MOSFET device Q1, and a lower (or low side) power MOSFET device Q2 with appropriate logic and driver circuitry.

When the upper MOSFET switch Q1 is 'On', the inductor Lout current increases, inducing a positive voltage drop across the inductor Lout and a lower output supply voltage Vout in reference to the input source voltage Vin. When the MOSFET switch Q1 is 'Off', the lower MOSFET switch Q2 turns 'On' to provide the current path for the inductor Lout when discharging. The inductor current discharges thereby inducing a negative voltage drop across the inductor Lout. The output capacitance Cout and resistor Rout acts as a low-pass filter, reducing output voltage ripple as a result of the fluctuating current through the inductor Lout.

The upper MOSFET device Q1 is turned 'On' and 'Off' by a gate switching signal applied to its gate from the control and driver logic unit 20 in combination with the AND1 gate and the driver D1. The drivers D1 and D2 in this embodiment are a driver with shoot through protection as is known in the art. The lower MOSFET device Q2 is turned 'On' and 'Off' by a gate-switching signal supplied from control and driver logic unit 20 in combination with an OR1 gate and the driver D2. A common node between the MOSFETs Q1, Q2 is coupled through an inductor Lout to a load reservoir capacitor Cout that is coupled to a reference voltage terminal (GND) on one end. The connection between inductor Lout and capacitor Cout serves as an output node from which a desired (regulated) DC output voltage Vout is applied to a Load (not shown).

In voltage-mode PWM section 5, the divided-down output voltage VFB is fed to a differential amplifier U1 along with a voltage reference signal Vref. The hysteresis comparator U2 compares the COMP signal with an oscillator ramp to generate the duty cycle in order to regulate the output to the desired output voltage. PWM implementations are well known to those skilled in the art, and subject to various implementations. For example, U2 does not necessarily have to be a hysteresis comparator.

The output of the comparator U2 helps to establish the output voltage Vout via the MOSFETS Q1 and Q2. On a cycle-by-cycle basis, the greater the error voltage, the higher the comparator threshold on the comparator, and the longer the switch Q1 is held 'On'. As the switch Q1 is held on longer, the peak current in the inductor Lout is allowed to climb higher, storing more energy to serve the load and maintain regulation.

The output voltage Vout also goes through a separate resistor divider network or a feedback divider R1 and R2 in the over voltage protection section 10. A voltage divider generally employs two resistors connected in series and the feedback voltage is the input of the voltage comparator. As illustrated, the resistors R1 and R2 are serially coupled to the output voltage Vout. In a normal operation, the comparator U3 compares the divided voltage output signal Vout to the threshold over voltage value which is derived from the voltage reference Vref. The output of comparator U3 is normally 'Low' and the output Q of the latch U4 is also 'Low'.

Once the output voltage Vout increases above a set threshold of the over voltage comparator U3, comparator output goes 'High' and the latch U4 output is set to 'High'. The comparator U3 measures the difference between the threshold voltage (K * Vref) and the output voltage Vout signal from the divider network R1/R2 and generates a logic level output depending upon the difference signal. The latch U4 'High' signal is typically coupled directly to the OR1 gate and through the driver circuit D2 before entering the low side MOSFET Q2 thereby turning the low side MOSFET Q2 'On'. The 'High' signal from latch U4 is also inverted and is an input to the AND1 gate and driver circuit D1 for the high side MOSFET Q1, wherein the high side MOSFET Q1 is turned 'Off'.

Thus the low side MOSFET Q2 stays 'On' until the Power Ready reset is initiated, thereby allowing the output capacitor to discharge through the low side MOSFET Q2. The latch U4 can be reset by an inverse signal or Power Ready (IC bias voltage ready signal).

While this circuit has certain characteristics such as low jitter during an over voltage condition, it also has certain undesirable characteristics. For example, the energy stored in the output capacitor Cout is discharged through the low side of MOSFET Q2 which increases the likelihood of a large negative spike as further detailed herein. There are many state of the art circuits, such as ASICs coupled as a load, which can be damaged or destroyed if a negative spike develops. There can be several factors that may contribute to a damaging over voltage condition such as if the over voltage comparator is triggered by noise.

Figure 2:
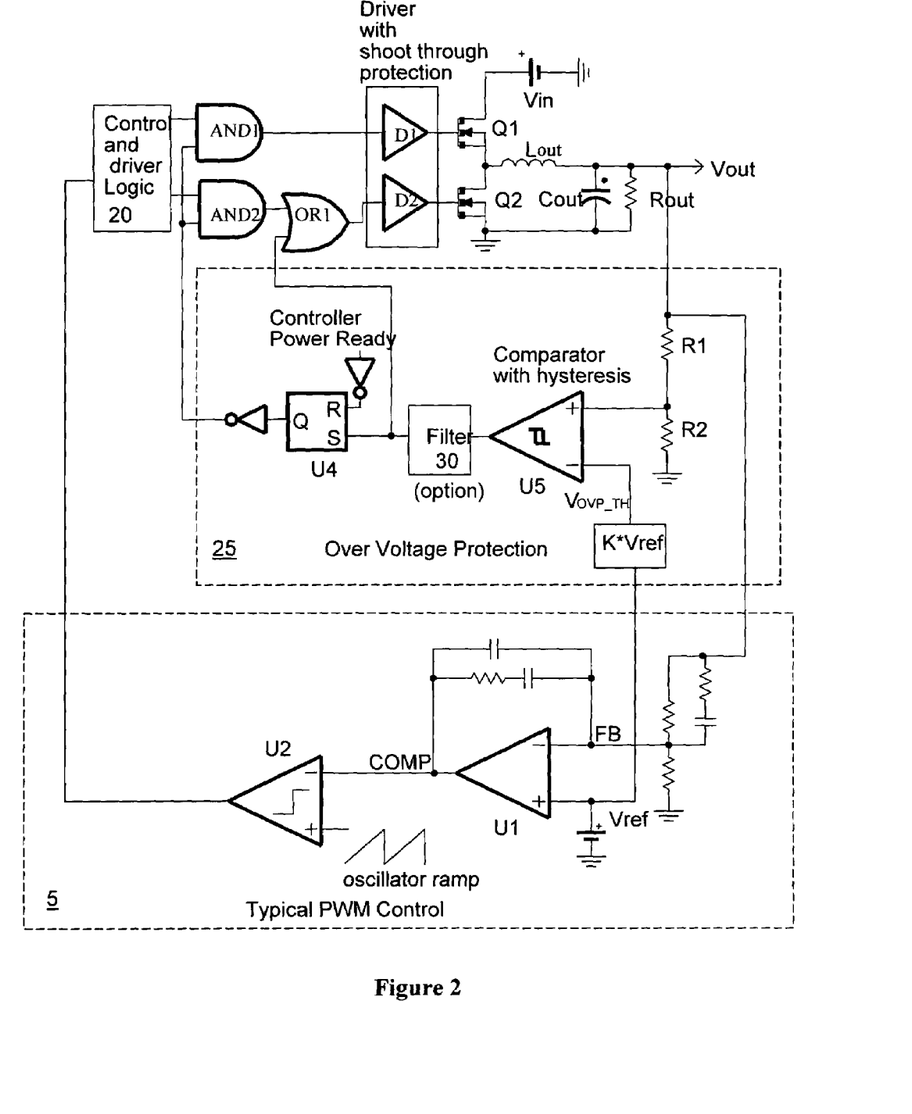
FIG. 2 is a block diagram illustrating an over voltage system configured in accordance with one embodiment of the present invention.

Referring to FIG. 2, one embodiment of the over voltage protection scheme of the present invention is depicted. In this particular configuration, the low side MOSFET Q2 is not latched 'On' during an over voltage condition but essentially follows the output of the comparator U5.

As detailed herein, the voltage divider network R1 and R2 of the over voltage protection section 10 is coupled to the output voltage Vout and is one input to the hysteresis comparator U5 and the other input is the threshold over voltage protection value $V_{OVP\_TH}$ derived from the voltage reference Vref. Thus the high threshold for indicating an over voltage condition is the threshold over voltage protection value $V_{OVP\_TH}$ plus any hysteresis values if applicable.

In general, hysteresis compensates for instability and bouncing of a comparator output caused by noisy signals by maintaining the circuit in a given state until the parameter rises somewhat above or below a pre-determined set point. In one embodiment of the present, the hysteresis is used because although the high threshold is set by the desired over voltage threshold $V_{OVP\_TH}$, the comparator output would otherwise switch as soon as the output voltage Vout was lower than the threshold over voltage value $V_{OVP\_TH}$. However, it is advantageous to set the low threshold at a lower level, thus hysteresis allows a low level threshold. For illustrative purposes only, the hysteresis of comparator U5 in one example is 45% of the reference voltage Vref.

An over voltage condition occurs when the difference between the divided output voltage Vout signal and the over voltage threshold $V_{OVP\_TH}$ is sufficient to generate a 'High' signal. This 'High' signal is an input to the OR1 gate thereby turning the low side MOSFET Q2 'On'. The output of the hysteresis comparator U5 is also an input to the latch U4 and the output of the latch U4 is inverted and used as an input to the AND1 gate which then turns Q1 'Off'. The additional AND2 gate is used for the reset to turn off the Q2 MOSFET.

As the output voltage Vout decreases and falls below the over voltage threshold value $V_{OVP\_TH}$, the output from the comparator U5 changes from a 'High' to a 'Low'. In one embodiment the low threshold of the comparator U5 is the hysteresis level. The comparator U5 is now a 'Low' signal to the OR1 gate, thereby switching MOSFET Q2 'Off'. In one embodiment, for illustrative purposes, the Vout would drop to about 75% of the reference voltage Vref and trigger the change in the comparator U5 from a 'High' to a 'Low'. Unlike traditional over voltage protection which latches the low side MOSFET 'On', the present invention switches the low side MOSFET 'Off' without a latch reset. The high side MOSFET Q1 can be switched back 'On' by a reset signal to the latch U4. In one embodiment the latch is an SR flip-flop. An optional filter 30 can be used at the output signal from the comparator U5. The optional filter 30 can be added after the comparator and further reduce effects from noise. The filter 30 can count a number of logic states from the comparator U5 over a number of cycles to substantiate a logic High from noisy signals. For example, if the Output Voltage Vout from the output voltage capacitor Cout goes High for three switching cycles, then the over voltage condition is confirmed and the system responds to the over voltage condition as detailed herein. If the output voltage Vout goes High for less than three switching cycles, the over voltage section 25 considers it as noise. It should be understood that the number of cycles can be any number according to the particulars of the environment.

Figure 3A:
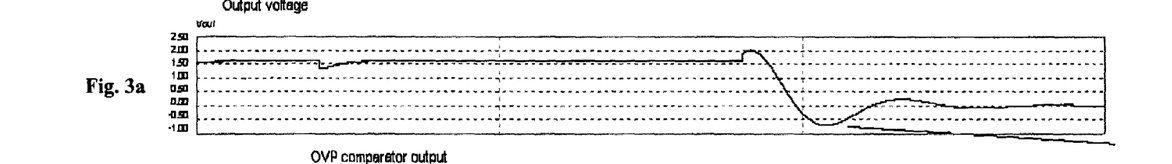
FIG. 3a illustrates a graphical depiction of the prior art synchronous buck converter of FIG. 1 showing the Output voltage versus time.
Figure 3B:
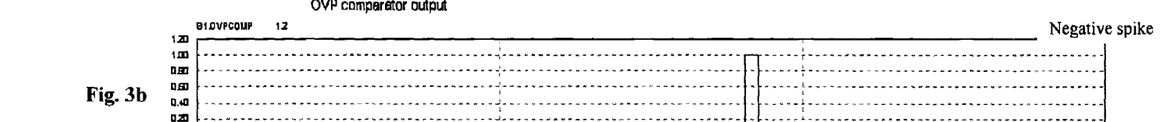
FIG. 3b illustrates a graphical depiction of the prior art synchronous buck converter of FIG. 1 showing the Over Voltage Comparator Output versus time.

FIGS. 3a-3e graphically illustrate the various response curves for the prior art circuit of FIG. 1. Referring to FIG. 3a, the output voltage Vout is shown at about 1.5 volts. The output voltage Vout jumps to about 2 volts at about 2.7 ms resulting in an over voltage condition caused by a load transient response. The over load response results when the load transitions from full load to no load, and the PWM controller turns 'Off' the high side switch Q1, and the energy stored in the inductor will charge the output voltage and cause the over voltage to occur. When this occurs it is outside the threshold of the comparator and the comparator generates a 'High' signal as noted in FIG. 3b. It should be noted that the comparator output is 'High' only for a very short time until the output voltage dropped below the upper threshold limit.

Figure 3C:
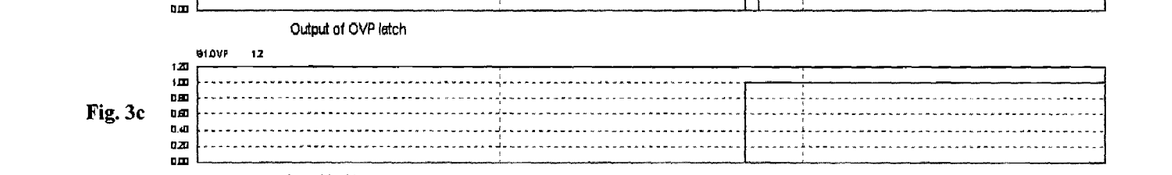
FIG. 3c illustrates a graphical depiction of the prior art synchronous buck converter of FIG. 1 showing the Over voltage protection latch output versus time.
Figure 3D:
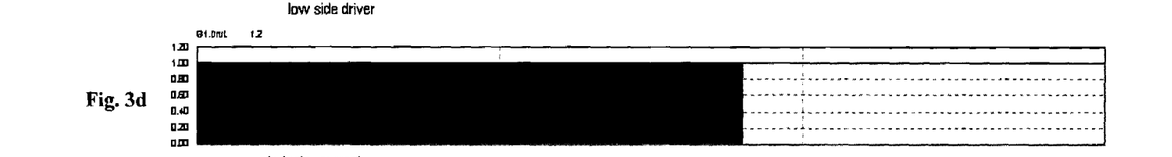
FIG. 3d illustrates a graphical depiction of the prior art synchronous buck converter of FIG. 1 showing the synchronous switch driver versus time.

The 'High' signal from the comparator triggers the latch which in turn causes the latch output to switch to 'High' as noted in FIG. 3c. The latch output remains 'High' until it is reset by the Power Ready signal. The 'High' signal from the comparator also causes the low side MOSFET to switch 'On' as noted by FIG. 3d.

Figure 3E:
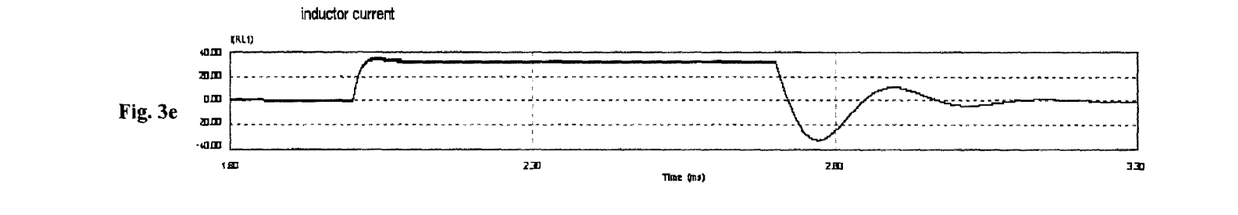
FIG. 3e illustrates a graphical depiction of the prior art synchronous buck converter of FIG. 1 showing the inductor current (Lout) versus time.

The result of switching the high side MOSFET 'Off' and the low side MOSFET 'On' causes the output voltage to rapidly decrease as shown in FIG. 3a, as the current in the output capacitor is discharged through the low side MOSFET. The inductor current also drops as shown in FIG. 3e.

As noted in FIGS. 3a and 3e, the inductor current swings negative and correspondingly, the output voltage Vout swings below zero causing a large negative spike. This spike has the potential to cause irreparable harm to certain sensitive electronic components.

Figure 4A:
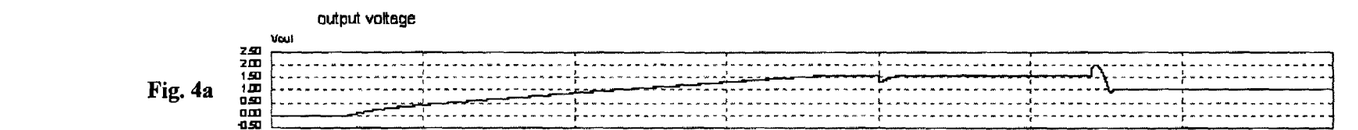
FIG. 4a illustrates a graphical depiction of the synchronous buck converter of FIG. 2 showing the Output voltage versus time configured in accordance with one embodiment of the present invention.

Referring to FIGS. 4a-f, the waveforms show the characteristics according to one embodiment of the present invention. In FIG. 4a, the output voltage Vout is shown starting from zero volts and includes an over voltage condition that is depicted at about 2.7 ms, wherein the output voltage goes from about 1.5 V to about 2 V.

Figure 4B:
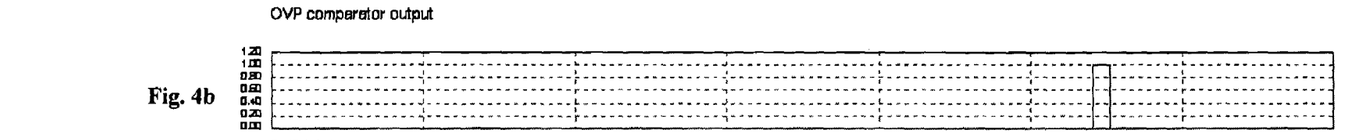
FIG. 4b illustrates a graphical depiction of the synchronous buck converter of FIG. 2 showing the OVP Comparator output versus time configured in accordance with one embodiment of the present invention.
Figure 4C:
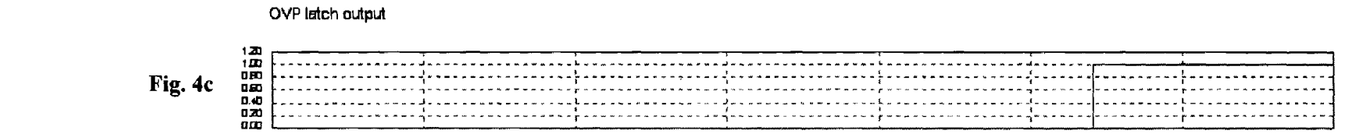
FIG. 4c illustrates a graphical depiction of the synchronous buck converter of FIG. 2 showing the OVP Latch output versus time configured in accordance with one embodiment of the present invention.
Figure 4D:
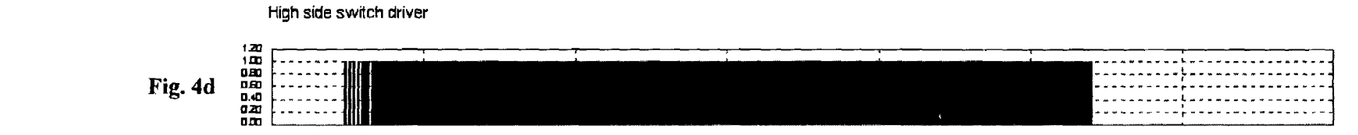
FIG. 4d illustrates a graphical depiction of the synchronous buck converter of FIG. 2 showing the high side MOSFET driver versus time configured in accordance with one embodiment of the present invention.

Upon the occurrence of the over voltage of Vout, the over voltage comparator output of FIG. 4b shows the comparator going 'High'. The 'High' output from the comparator then causes the over voltage protection section latch to go 'High' as shown in FIG. 4d, which then shuts off the high side MOSFET Q1 as well as turns 'On' the driver signal from the OR1 gate for Q2.

Figure 4E:
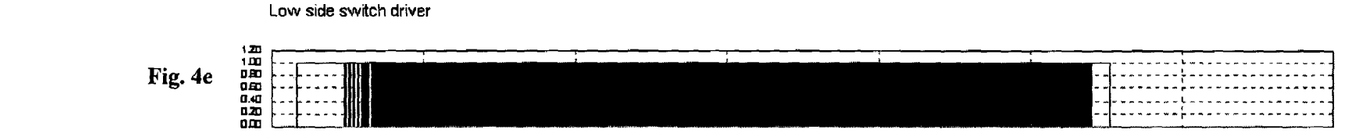
FIG. 4e illustrates a graphical depiction of the synchronous buck converter of FIG. 2 showing the low side MOSFET driver versus time configured in accordance with one embodiment of the present invention.
Figure 4F:
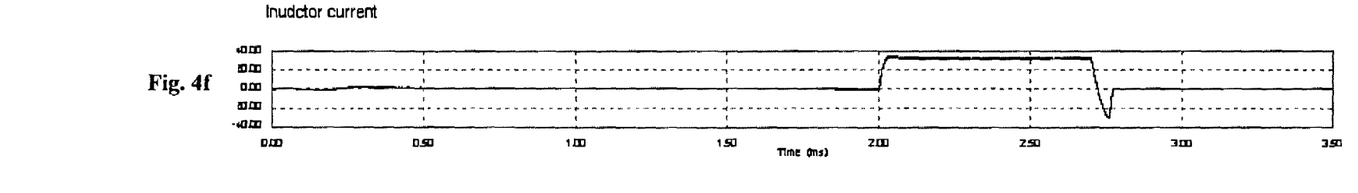
FIG. 4f illustrates a graphical depiction of the synchronous buck converter of FIG. 2 showing the inductor current (Lout) versus time configured in accordance with one embodiment of the present invention.

The high comparator output signal sets the low side MOSFET driver 'High' as shown in FIG. 4e, which turns the low side MOSFET 'On'. Unlike the traditional approach, there is no latch controlling the low side MOSFET. The inductor current is shown in FIG. 4f and still has a negative swing.

As the output voltage Vout drops back to within the allowable range as noted in FIG. 4a, the output of the comparator also goes from a 'High' to a 'Low' as noted in FIG. 4b. The latch output switches 'High' as noted in FIG. 4c and remains 'High'. The high side switch driver turns 'Low' as depicted in FIG. 4d and the high side MOSFET remains 'Off'. The 'High' signal from the comparator also turns OR1 'High' as noted in FIG. 4e until the voltage output Vout drops into the allowable range and the comparator output go 'Low', causing the low side MOSFET driver to go 'Low' and the low side MOSFET turns 'Off'. FIG. 4f shows the inductor current charged in the output inductor Lout throughout the over voltage condition. As noted in FIG. 4a, there is no negative voltage spike in the output voltage Vout.

Figure 5:
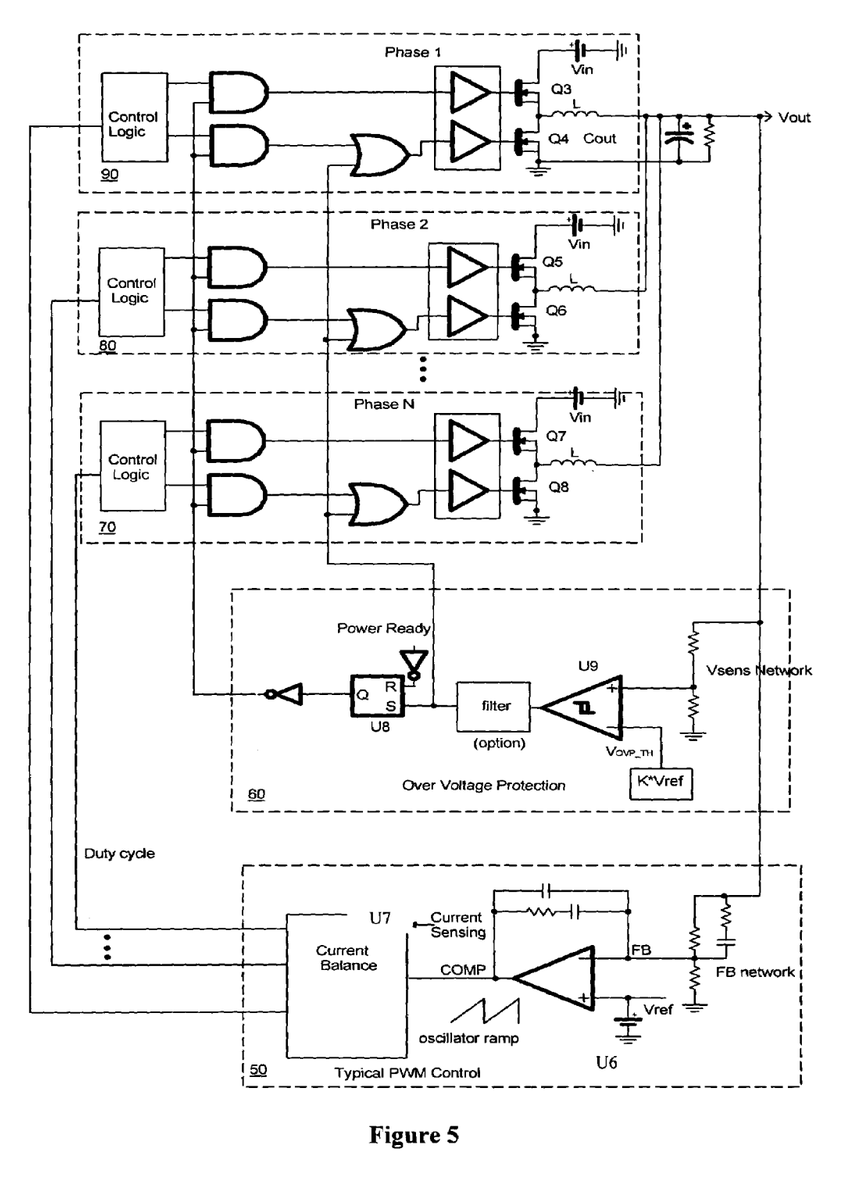
FIG. 5 is an illustration of the over voltage protection scheme for multiphase synchronous buck converter configured in accordance with one embodiment of the present invention.

Referring to FIG. 5, another embodiment of the present invention is for a multiphase synchronous buck converter. The present over voltage protection scheme is suitable for multiphase application and likely a more cost effective solution. While single-phase synchronous converter may not need over voltage protection, multiphase synchronous buck converter is applied to very expensive integrated circuits such as microprocessors. Especially since the microprocessor load is more sensitive to the negative voltage spike caused by traditional over voltage protection schemes.

As shown in FIG. 5, there is a PWM Control section 50 and the Over Voltage Protection section 60. The PWM section 50 employs a feedback network coupled to the output voltage and a comparator to generate the control commands for the multiphase pulse width modulated switching section 70, 80, 90. The output of the comparator is coupled to a Current Balance section U7 which includes a current sensing function as is known in the art.

Both the PWM Control section 50 and the Over Voltage Protection section 60 are electrically coupled to the multiphase switching sections 70, 80, 90. Within the multiphase switching sections 70, 80, 90 representing individual phase switches Phase 1-Phase N, are the supporting logic and driver section, logic circuits, MOSFETs, and output inductors as previously described. Each of these individual phase switch sections 70, 80, 90 is electrically coupled to the output capacitor Cout and output resistor Rout of the output voltage line Vout. The individual sections function as described such that an over voltage condition that triggers the over voltage comparator U9 will turn off the high side MOSFETs Q3, Q5, Q7 via the latch section U8. The over voltage comparator U9 will also temporarily turn on the low side MOSFET Q4, Q6, Q8 until the output voltage Vout falls back within the acceptable range established by the hysteresis comparator U9 at which point the comparator signal goes from 'Low' to 'High' and the low side MOSFETs Q4, Q6, Q8 are turned off.

Figure 6:
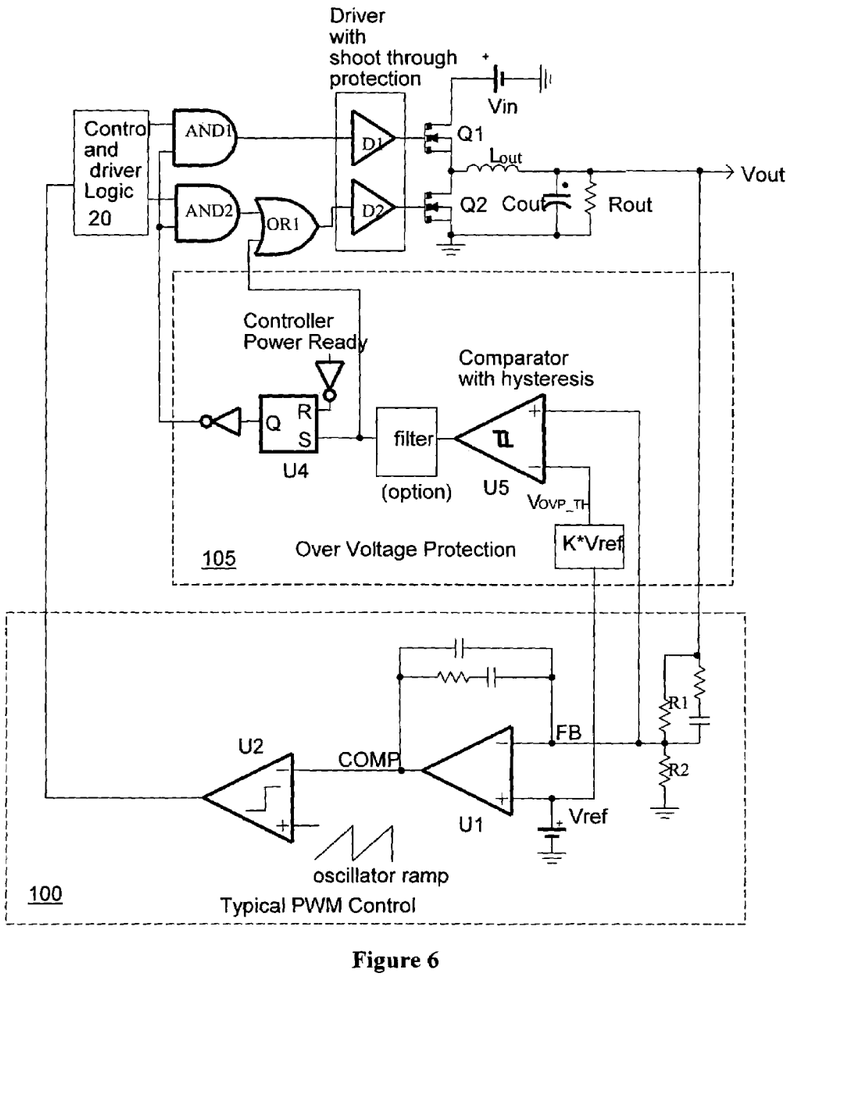
FIG. 6 shows an over voltage protection scheme with a single voltage sense network configured in accordance with one embodiment of the present invention.

Referring to FIG. 6, the over voltage protection circuit 105 is illustrated in a further variation. In this particular embodiment, the over voltage protection section 105 utilizes the voltage sensing network R1/R2 from the PWM control section 100 thereby reducing the number of components in the circuit.

Figure 7:
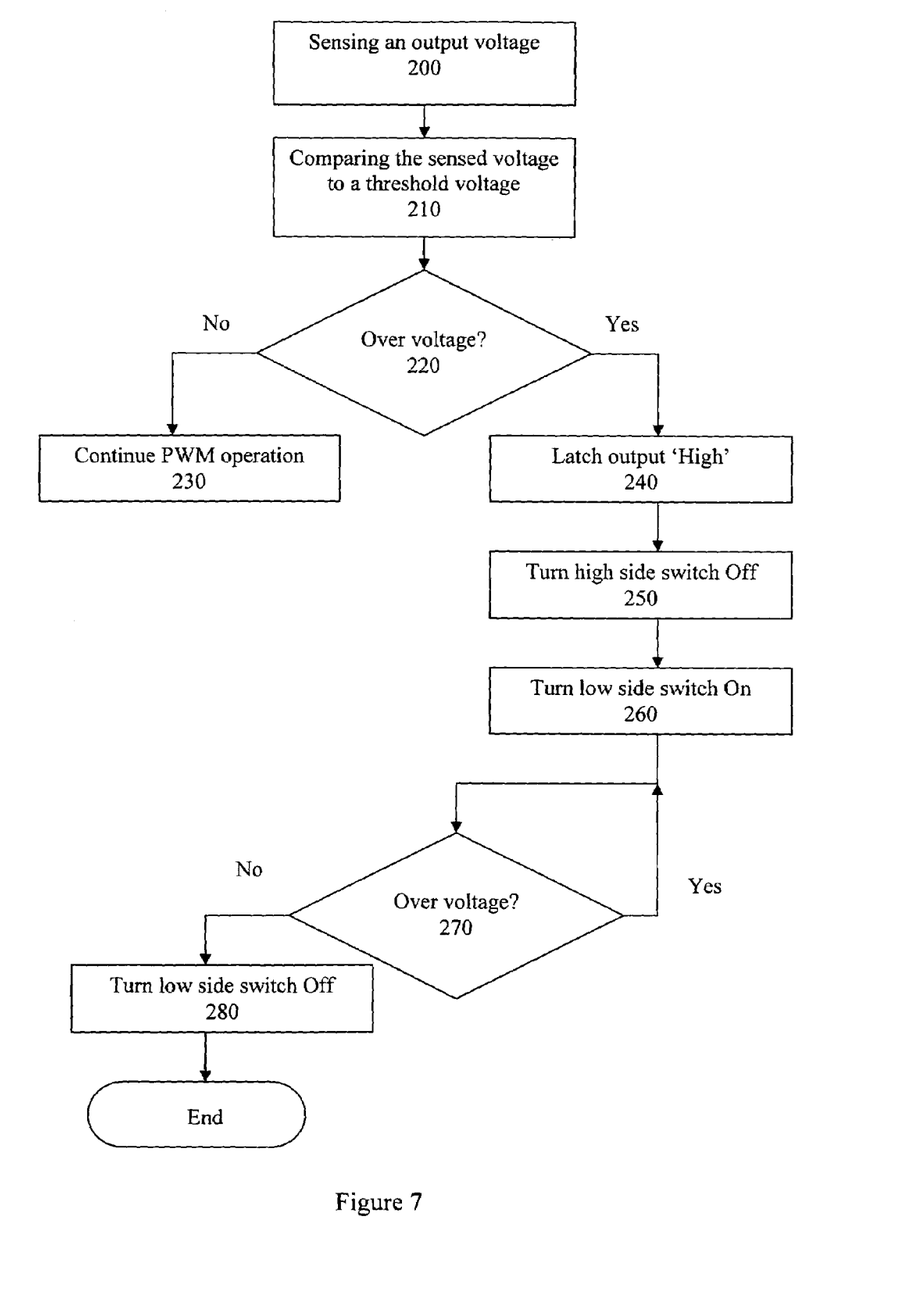
FIG. 7 is a flow chart diagram illustrating some steps and configured in accordance with one embodiment of the invention.

A simplified flow chart diagram is shown in FIG. 7. After power-up and establishing the PWM output signal for the synchronous buck converter, the sensing network monitors the output voltage Vout via a sensing network 200. A hysteresis comparator compares the sensed output voltage with a threshold voltage 210. If the sensed output voltage is within acceptable parameters, the PWM processing continues 230. If there is an over voltage condition 220, the comparator output latches the output 'High' thereby turning the high side switch 'Off' 250. The output from the comparator 'High' signal also sets the low side switch 'High' allowing the inductor to discharge 260. The sensing step continues, and when the output voltage is within acceptable parameters 270, the low side switch is turned 'Off' 280.

The present invention according to one embodiment is an over voltage protection scheme wherein the low side FET device is not latched. Further variations include an over voltage protection scheme wherein upon an over voltage condition, the low side switching device, such as Q2, is turned 'On'—but if the output voltage drops to be below a certain voltage such as 75% of the voltage reference, the low side switching device is turned 'Off'. There are a variety of methods to operate the low side switch according to the teaching herein besides using a comparator. The present invention is not limited to a specific circuit arrangement but to the concept of having the low side switch turns 'Off' if the output voltage falls within the appropriate bounds.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An over voltage protection circuit in a buck converter, comprising:

at least one switching section in said buck converter, each said section having a high side switch and a low side switch regulating an output voltage of said buck converter, said over voltage protection circuit comprising:

a voltage sensing network electrically coupled to said output voltage;

a comparator having a first input electrically coupled to said voltage sensing network, and a second input electrically coupled to a reference voltage and wherein a comparator output is electrically coupled to said low side switch; and a latch having a latching input electrically coupled to said comparator output and a latching output electrically coupled to said high side switch, wherein said low side switch is coupled to said comparator output without said latch; and wherein said over voltage protection circuit controls said low side switch and said high side switch to protect a load during an over voltage condition, such that during said over voltage condition said low side switch follows said comparator output.

2. The circuit according to claim 1, further comprising a filter coupled to said comparator output.

3. The circuit according to claim 1, wherein said comparator is a hysteresis comparator with a predetermined hysteresis band.

4. The circuit according to claim 3, wherein a low threshold of said comparator is based on said predetermined hysteresis band.

5. The circuit according to claim 1, wherein said voltage sensing network is a resistor voltage divider.

6. The circuit according to claim 1, wherein said switching devices are selected from the group consisting of: Metal-Oxide-Semiconductor Field-Effect Transistors (MOSFETs), Field-Effect Transistors (FETs) and Insulated Gate Bipolar Transistors (IGBTs).

7. The circuit according to claim 1, wherein said latch is an SR flip-flop.

8. The circuit according to claim 3, wherein an upper threshold voltage of said hysteresis comparator is derived from a voltage reference.

9. The circuit according to claim 1, wherein said buck converter has a pulse width modulating section.

10. A synchronous buck converter, comprising:
at least one switching section with a high side switch and a low side switch, said switching section providing a voltage output;
a pulse width modulating section coupled to said switching section and regulating said voltage output; and
an over voltage protection section comprising a hysteresis comparator, said comparator having a first input coupled to a threshold over voltage reference and a second input coupled to an output voltage sensing network, a latch with a latch input is coupled to an output of said comparator wherein an output of said latch latches said high side switch and wherein said low side switch is electrically coupled to said output of said comparator without coupling through said latch.

11. The converter according to claim 10, wherein said voltage sensing network is part of said pulse with modulator section.

12. The converter according to claim 10, wherein said converter is a single phase and there is one said switching section.

13. The converter according to claim 10, wherein said converter is a multiphase, each phase of said multiphase converter coupled to said at least one switching section.

14. The converter according to claim 10, wherein said pulse width modulator section further comprises a current balance.

15. The converter according to claim 10, further comprising a filter coupled to said comparator output.

16. A method for over voltage protection for a synchronous buck converter, comprising:
sensing an output voltage of a switching section of said buck converter, said switching section having a high side switch and a low side switch;
comparing said sensed output voltage to a threshold voltage to determine an over voltage condition;
upon said over voltage condition, latching said high side switch Off, and turning said low side switch On; and
turning said low side switch Off when said sensed output voltage is below a low threshold voltage for said over voltage protection.

17. The method according to claim 16, wherein said step of turning said low switch Off reduces a large negative spike on said voltage output.

18. The method according to claim 16, further comprising resetting the converter.

19. The method according to claim 16, wherein said low threshold is a hysteresis value.

20. The method according to claim 16, further comprising filtering of at least two cycles of sensing and comparing to determine said over voltage condition.

* * * * *